United States Patent
Golubovic et al.

(10) Patent No.: US 10,164,689 B2
(45) Date of Patent: Dec. 25, 2018

(54) DISTRIBUTED ANTENNA SYSTEM TO TRANSPORT FIRST CELLULAR RF BAND CONCURRENTLY WITH ETHERNET OR SECOND CELLULAR RF BAND

(71) Applicant: CommScope Technologies LLC, Hickory, NC (US)

(72) Inventors: Boris Golubovic, San Francisco, CA (US); Lance K. Uyehara, San Jose, CA (US)

(73) Assignee: CommScope Technologies LLC, Hickory, NC (US)

(*) Notice: Subject to any disclaimer, the term of this patent is extended or adjusted under 35 U.S.C. 154(b) by 215 days.

(21) Appl. No.: 14/814,164

(22) Filed: Jul. 30, 2015

(65) Prior Publication Data
US 2016/0056866 A1     Feb. 25, 2016

Related U.S. Application Data

(60) Provisional application No. 62/040,853, filed on Aug. 22, 2014.

(51) Int. Cl.
*H04B 7/02*     (2018.01)
*H04B 7/024*     (2017.01)
(Continued)

(52) U.S. Cl.
CPC .............. *H04B 7/024* (2013.01); *H04L 41/04* (2013.01); *H04L 41/0806* (2013.01); *H04W 84/045* (2013.01); *H04W 88/085* (2013.01)

(58) Field of Classification Search
CPC ..... H04B 7/024; H04L 41/04; H04L 41/0806; H04W 84/045; H04W 88/085
See application file for complete search history.

(56) References Cited

U.S. PATENT DOCUMENTS 7,483,504 B2    1/2009   Shapira et al.
8,195,224 B2    6/2012   Saban et al.
(Continued)

FOREIGN PATENT DOCUMENTS

WO     2014048866     4/2014

OTHER PUBLICATIONS

International Search Authority, "International Search Report and Written Opinion for PCT Application No. PCT/US2015/043010", "from Foreign Counterpart to U.S. Appl. No. 14/814,134", dated Nov. 13, 2015, pp. 1-16, Published in: WO.
(Continued)

*Primary Examiner* — Kan Yuen
(74) *Attorney, Agent, or Firm* — Fogg & Powers LLC

(57) ABSTRACT

Embodiments described herein relate to a host unit for a distributed antenna system. The host unit includes a first radio access network (RAN) interface module to communicate with a RAN node. The host unit also includes a distribution module configured to distribute transport signals between one or more downstream RJ45 connectors and the first RAN interface module. One or more non-permanent connectors are included to couple the distribution module to a second RAN interface module and one or more upstream RJ45 jacks. The one or more upstream RJ45 jacks are configured to pass Ethernet signals therethrough. The distribution module is configured to couple a downlink portion of the first transport signals and either a downlink portion of the second transport signals or a downlink Ethernet signal from one of the upstream RJ45 jacks to a first twisted pair cable connected to one of one or more downstream RJ45 jacks.

35 Claims, 8 Drawing Sheets

(51) Int. Cl.
*H04W 84/04* (2009.01)
*H04W 88/08* (2009.01)
*H04L 12/24* (2006.01)

(56) References Cited

U.S. PATENT DOCUMENTS

| | | | |
|---|---|---|---|
| 8,213,401 B2 | 7/2012 | Fischer et al. | |
| 8,346,278 B2 | 1/2013 | Wala et al. | |
| 2003/0009761 A1* | 1/2003 | Miller | H04L 29/06 725/76 |
| 2004/0106387 A1 | 6/2004 | Bauman et al. | |
| 2007/0248024 A1* | 10/2007 | Conway | H04B 3/23 370/252 |
| 2009/0316608 A1 | 12/2009 | Singh et al. | |
| 2010/0177759 A1 | 7/2010 | Fischer et al. | |
| 2010/0177760 A1 | 7/2010 | Cannon et al. | |
| 2011/0075616 A1* | 3/2011 | Baldwin | H04W 88/085 370/329 |
| 2011/0130163 A1 | 6/2011 | Saban et al. | |
| 2011/0170476 A1 | 7/2011 | Shapira et al. | |
| 2011/0268446 A1 | 11/2011 | Cune et al. | |
| 2011/0274206 A1 | 11/2011 | Catreux et al. | |
| 2013/0003658 A1 | 1/2013 | Stewart et al. | |
| 2013/0136202 A1 | 5/2013 | Kummetz et al. | |
| 2013/0201916 A1 | 8/2013 | Kummetz et al. | |
| 2013/0308537 A1 | 11/2013 | Kummetz et al. | |
| 2013/0330086 A1 | 12/2013 | Berlin et al. | |
| 2014/0036780 A1 | 2/2014 | Sabat, Jr. et al. | |
| 2014/0079037 A1 | 3/2014 | Evans et al. | |
| 2014/0146905 A1* | 5/2014 | Zavadsky | H04B 7/0802 375/267 |
| 2016/0056865 A1 | 2/2016 | Uyehara et al. | |

OTHER PUBLICATIONS

International Search Authority, "International Search REport and Written Opinion for PCT Application No. PCT/US2015/043012", "from U.S. Appl. No. 14/814,164", dated Nov. 6, 2015, pp. 1-16, Published in: WO.

Haoming Li et al., "Efficient HetNet Implementation Using Broadband Wireless Access with Fiber-Connected Massively Distributed Antennas Architecture.", "IEEE Wireless Communications", Jun. 2011, pp. 72-78, vol. 18, No. 3, Publisher: IEEE.

"White Paper: Mobile Access Indoor Wireless Solution and Cisco WLANs", Sep. 2010, pp. 1-5, Publisher: Cisco Systems, Inc., Published in: San Jose, CA.

"MobileAccessVE: Coverage and Capacity Made Simple with Cellular-over-LAN", Nov. 2011, pp. 1-2, Publisher: Corning MobileAccess, Inc., Published in: Vienna, Virginia.

United States Patent and Trademark Office, "Office Action", "from U.S. Appl. No. 14/814,134", dated Jan. 31, 2017, pp. 1-41, Published in: US.

United States Patent and Trademark Office, "Final Office Action", "From U.S. Appl. No. 14/814,134", dated Aug. 1, 2017, pp. 1-27, Published in: US.

European Patent Office, "Extended European Search Report for EP Application No. 15833759.2", "Foreign counterpart to U.S. Appl. No. 14/814,164", dated Mar. 13, 2018, pp. 1-15, Published in: EP.

\* cited by examiner

DISTRIBUTED ANTENNA SYSTEM TO TRANSPORT FIRST CELLULAR RF BAND CONCURRENTLY WITH ETHERNET OR SECOND CELLULAR RF BAND

CROSS-REFERENCE TO RELATED APPLICATIONS

This application claims the benefit of U.S. Provisional Patent Application Ser. No. 62/040,853, filed on Aug. 22, 2014, which is hereby incorporated herein by reference.

BACKGROUND

Distributed Antenna Systems (DAS) are used to distribute wireless signal coverage into buildings or other substantially closed environments. For example, a DAS may distribute antennas within a building. The antennas are typically connected to a radio frequency (RF) signal source, such as a service provider. Various methods of transporting the RF signal from the RF signal source to the antenna have been implemented in the art.

SUMMARY

Embodiments described herein relate to a host unit for a distributed antenna system. The host unit includes a first radio access network (RAN) interface module to communicate with a RAN node, first signals corresponding to a first cellular radio frequency (RF) band, the first RAN interface module is configured to convert between the first signals and first transport signals, wherein the first transport signals are in a first frequency spectrum. The host unit also includes a distribution module coupled to the first RAN interface module. The distribution module is configured to distribute the first transport signals between one or more downstream RJ45 connectors and the first RAN interface module. The host unit also includes one or more non-permanent connectors to couple the distribution module to a second RAN interface module and a set of one or more upstream RJ45 jacks. The second RAN interface module is configured to communicate with a RAN node, second signals corresponding to a second cellular RF band and to convert between the second signals and second transport signals. The one or more upstream RJ45 jacks are configured to pass Ethernet signals therethrough. The distribution module is configured to couple a downlink portion of the first transport signals and either a downlink portion of the second transport signals or a downlink Ethernet signal from one of the upstream RJ45 jacks to a first twisted pair cable connected to one of one or more downstream RJ45 jacks. The distribution module is configured to couple an uplink portion of the first transport signals on the first twisted pair cable to the first RAN interface module and to couple either an uplink portion of the second transport signals or an uplink Ethernet signal from the first twisted pair cable to the one or more non-permanent connectors. The first frequency spectrum of the first transport signals is non-overlapping with a frequency spectrum of the second transport signals and with a frequency spectrum of the uplink and downlink Ethernet signals, wherein an uplink or downlink portion of the first transport signals is communicated concurrently with an uplink or downlink portion of the either the second transport signals or the uplink and downlink Ethernet signals over the first twisted pair cable. The first transport signals and either the second transport signal or the uplink and downlink Ethernet signals are sent between the host unit and a first active antenna unit (AAU) over the first twisted pair cable.

DRAWINGS

Understanding that the drawings depict only examples and are not therefore to be considered limiting in scope, the examples will be described with additional specificity and detail through the use of the accompanying drawings, in which.

In accordance with common practice, the various described features are not drawn to scale but are drawn to emphasize specific features relevant to the examples. Like reference numbers and designations in the various drawings indicate like elements.

DETAILED DESCRIPTION

The embodiments described below relate to a distributed antenna system (DAS) and components within the distributed antenna system (DAS). The distributed antenna system is connected to at least one radio access network (RAN) through at least one radio access network (RAN) interface. In exemplary embodiments, the distributed antenna system includes a distributed antenna system host unit that interfaces with the at least one radio access network (RAN) and at least one Ethernet device. The host unit is operable to transport cellular radio frequency (RF) signals to/from the RAN and Ethernet signals to/from the Ethernet device over one or more twisted pair cables to one or more active antenna units (AAUs). In particular, the host unit and the one or more AAUs are configurable into either a cellular RF with Ethernet transport state or a dual cellular RF transport state. In the cellular RF with Ethernet state, a baseband Ethernet signal is transported between the host unit and a given AAU concurrently with an intermediate frequency (IF) version of a cellular RF signal. In the dual cellular RF state, an IF version of a first cellular RF band is transported between the host unit and the given AAU concurrently with an IF version of a second cellular RF band.

Figure 1:
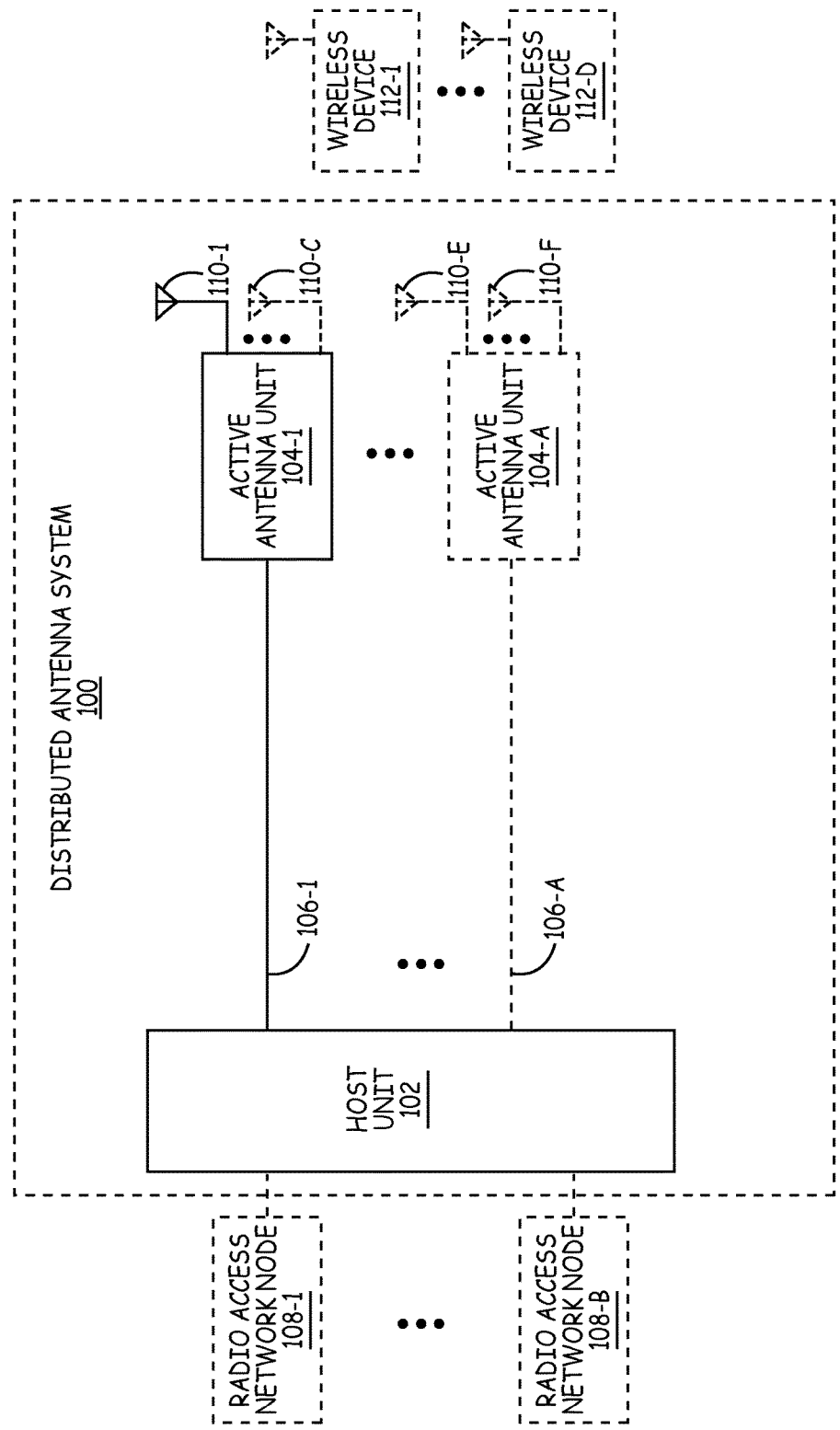
FIG. 1 is block diagram of an example of a distributed antenna system (DAS) that transports signals between a host unit and at least one active antenna units (AAU) over at least one twisted pair cable.

FIG. 1 is a block diagram of an example distributed antenna system 100. Distributed antenna system 100 includes a host unit 102 and at least one active antenna unit (AAU) 104 (including AAU 104-1 and any quantity of optional AAUs 104 through optional AAU 104-A) communicatively coupled to the host unit 102 through at least one twisted pair cable 106 (including twisted pair cable 106-1 and any quantity of optional twisted pair cables 106 through optional twisted pair cable 106-A). Specifically, AAU 104-1 is communicatively coupled to the host unit 102 across twisted pair cable 106-1 and optional AAU 104-A is communicatively coupled to the host unit 102 across twisted pair cable 106-A. In an example, each twisted pair cable 106 is an "Ethernet cable" that conforms to one of the category 5, category 5e, category 6, category 6a, or category 7 specifications. Future twisted pair cable specifications used for Ethernet signals are also included. In some examples, multiple twisted pair cables 106 can be coupled in series between the host unit 102 and one or more of the AAUs 104. In such examples, a passive device such as a patch panel or wall outlet can be coupled between the host unit 102 and an AAU 104 to couple such serially coupled cables together.

The host unit 102 is communicatively coupled to at least one radio access network (RAN) node 108 (including radio access network (RAN) node 108-1 and any quantity of optional radio access network (RAN) node 108 through optional radio access network (RAN) node 108-B). The host unit 102 is configured to bi-directionally communicate signals with the RAN node 108, wherein the signals correspond to a cellular (wireless) radio frequency (RF) band. As used herein, a downlink signal "corresponds to" a cellular RF band if the downlink signal is an RF signal in the cellular RF band or is used to derive a wireless RF signal in the cellular RF band. Similarly, an uplink signal "corresponds to" a cellular RF band if the uplink signal is an RF signal in the cellular RF band or is derived from a RF signal in the cellular RF band. Examples of signals used to derive or derived from an RF signal in the cellular RF band include frequency shifted versions of the RF signal (e.g., an intermediate frequency (IF) or baseband signal), a base station communication protocol signal (e.g., CPRI, OBSAI) corresponding to the RF signal, internet protocol (IP) data corresponding to the RF signal, a signal containing digital (e.g., I and Q) samples of the RF signal, or a signal containing digital samples of an IF or baseband version of the RF signal. Each RAN node 108 can comprising a base station, base transceiver station, IP gateway, or other radio access network device.

In the downlink, the host unit 102 receives a downlink signal corresponding to a cellular RF band from a RAN node 108, and generates a transport signal based on the downlink signal. The host unit 102 sends the transport signal over the twisted pair cable 106 to the AAU 104 coupled to the twisted pair cable 106. The transport signal is an IF version of the cellular RF band signal. The AAU 104 receives the transport signal, and generates an RF signal in the cellular RF band from the transport signal. The AAU 104 wirelessly transmits the RF signal in the cellular RF band from at least one antenna 110 to a wireless device 112.

In the uplink, the AAU 104 receives a wireless RF signal in the cellular RF band at the at least one antenna 110 from a wireless device 112. The AAU 104 generates a transport signal based on the RF signal received and sends the transport signal over the twisted pair cable 106 to the host unit 102. The host unit 102 receives the transport signal and generates an uplink signal formatted for the RAN node 108 based on the transport signal. The uplink signal corresponds to the wireless RF signal received at the AAU 104. The host unit 102 sends the uplink signal to the RAN node 108.

Each AAU 104 is configured to transmit one or more radio frequency signals in the cellular radio frequency band to at least one wireless device 112 (including wireless device 112-1 and any quantity of optional wireless devices 112 through optional wireless device 112-D) using at least one antenna 110. In an example, the AAU 104-1 is configured to transmit and receive a single band of RF signals at a time.

Similarly in the reverse/uplink path, in examples each AAU 104 is configured to receive an uplink radio frequency (RF) signal from at least one wireless device 112 using at least one antenna 110. Each AAU 104 is further configured to convert the radio frequency signals to a transport signal as described above.

In examples, a master reference clock is distributed between the various components of the distributed antenna system 100 to keep the various components locked to the same clock. In examples, the master reference clock is generated based on a signal received from the at least one radio access network node 108-1. In examples, the master reference clock is generated within a component of the distributed antenna system 100, such as the host unit 102 or an AAU 104.

In addition to signals corresponding to a cellular RF band, DAS 100 can be configured to transport Ethernet signals on the at least one twisted pair cable 106 concurrently with the transport signals. The Ethernet signals are sent through the DAS 100 between a first Ethernet device 114 coupled to the host unit and a second Ethernet device 116 coupled to the AAU 104.

Figure 2:
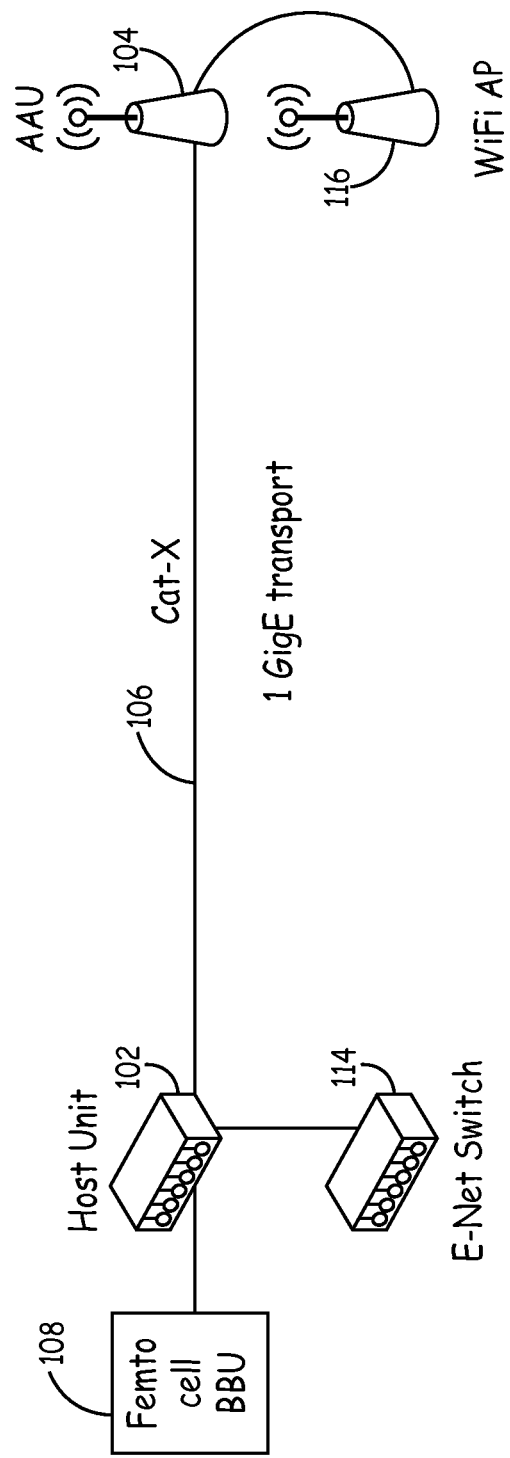
FIG. 2 is a block diagram of an example of a single twisted pair cable in the DAS of FIG. 1 wherein the DAS is set to transport the Ethernet signals along with the transport signals over the twisted pair cable.

FIG. 2 illustrates an example of a single twisted pair cable 106 in the DAS 100 wherein the DAS 100 is set to transport the Ethernet signals along with the transport signals over the twisted pair cable 106. In an example, to enable such transport the host unit 102 is coupled to at least the first Ethernet device 114 and couples Ethernet signals from the first Ethernet device 114 to the twisted pair cable 106. Ethernet signals are signals in compliance with an IEEE 802.3 standard. Such signals are comprised of Ethernet frames. In an example, such Ethernet frames can transport TCP/IP data to and from the first Ethernet device 114.

The host unit 102 passes the Ethernet signals between the twisted pair cable 106 and the first Ethernet device 114. The Ethernet signals on the twisted pair cable 106 propagate between the host unit 102 and the AAU 104. These Ethernet signals are passed through the AAU 104 to a second Ethernet device 116 coupled to the AAU 104. Accordingly, the first Ethernet device 114 can communicate with the second Ethernet device 116 using a wired Ethernet protocol (i.e., an IEEE 802.3 protocol), wherein the Ethernet signals communicated by the first Ethernet device 114 and the second Ethernet device 116 are passed through the host unit 102 and the AAU 104.

In another example, the host unit 102 includes an Ethernet device therein, such as an Ethernet switch. In such an example, instead of passing through the Ethernet signals between the host unit 102 and the first Ethernet device 114, the host unit 102 sends and receives first Ethernet signals with the first Ethernet device 114 and generates second Ethernet signals to communicate on the twisted pair cable 106 to the AAU 104. Accordingly, a first Ethernet link is formed between the first Ethernet device 114 and the host unit 102 and a second Ethernet link is formed between the host unit 102 and the second Ethernet device 116. In the downlink the host unit 102 receives the Ethernet signals from the first Ethernet device 114, unpacks the Ethernet frames, obtains the TCP/IP data therefrom, and generates new Ethernet frames to transport the TCP/IP data from the host unit 102 to the second Ethernet device 116. Accordingly, new Ethernet signals are communicated between the host unit 102 and the second Ethernet device 116. In the uplink, Ethernet signals received from the second Ethernet device 116 are unpacked to obtain the TCP/IP data therein. This TCP/IP data is repackaged in new Ethernet frames and transmitted to the first Ethernet device 114.

The first and second Ethernet device 114, 116, can be any device configured to send and receive signals conforming to a wired Ethernet protocol. For example, the first Ethernet device 114 can be an Ethernet switch, and the second Ethernet device 116 can be a wireless local area network (WLAN) access point (also referred to herein as a "wireless access point"). In an example, such a WLAN access point complies with an IEEE 802.11 standard for transmitting and receiving wireless LAN signals. In other examples, the first and/or second Ethernet device 114, 116 can include an Ethernet router, switch, or hub, a personal computing device (e.g., desktop, laptop) having an Ethernet interface, a wireless access point, or other device configured to send and receive Ethernet signals.

Figure 3:
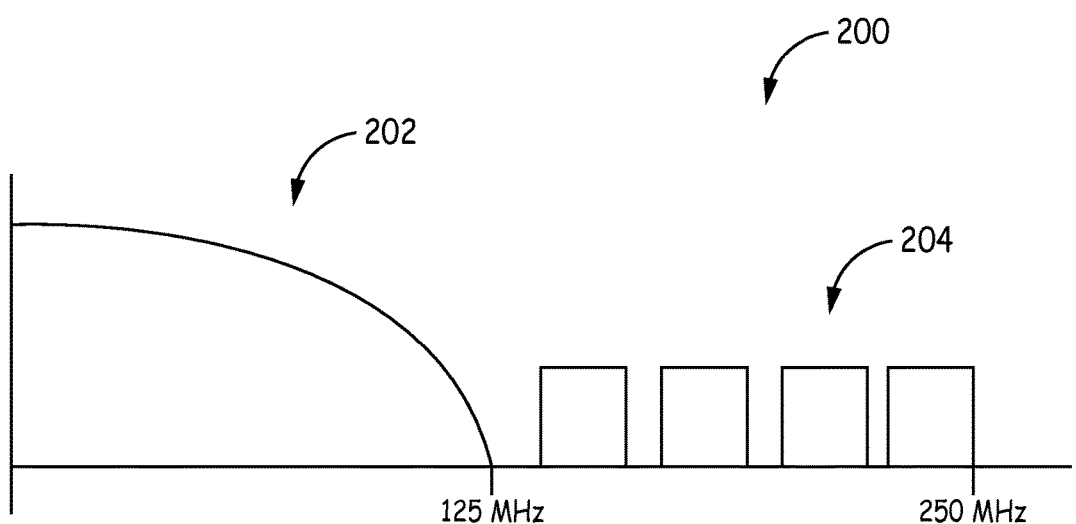
FIG. 3 is graph illustrating example frequency spectrum of the twisted pair cable coupled between the host unit and the AAU of FIG. 2.

The Ethernet signals and the transport signals can be sent between the host unit 102 and the AAU 104 concurrently on the twisted pair cable 106. The transport signals on the twisted pair cable 106 are sent as an IF version of the cellular RF band signals, wherein the IF signal is in a frequency spectrum higher than the Ethernet signals. FIG. 3 is graph illustrating example frequency spectrum 200 of the twisted pair cable 106 coupled between the host unit 102 and the AAU 104. As shown, the Ethernet signal 202, which conforms to an Ethernet protocol, is a baseband signal occupying the bandwidth from about 125 Mhz down to zero. The transport signals 204 are sent in a bandwidth that is above 125 Mhz so the transport signals 204 do not interfere with the Ethernet signals. In this example, the transport signals 204 occupy the bandwidth from about 133 Mhz to 250 Mhz. In this way a bi-directional Ethernet signal 202 and bi-directional transport signal 204 can be sent on the twisted pair cable 106 at the same time.

Using the same twisted pair cable 106 for transport signals 204 and Ethernet signals 202 is advantageous because it enables the DAS 100 to be added on to an existing Ethernet network. For example, a building may have Ethernet cables already run to various locations throughout the building to provide wired or wireless local area network (LAN) service to those locations. In order to install a traditional DAS in the building coaxial or fiber optic cables would likely need to be run throughout the building, resulting in increased cost and time for the DAS installation. The DAS 100, however, can utilize the existing LAN cables to provide the transport between the host unit 102 and the at least one AAU 104, reducing or eliminating the expense and time required to run coaxial or fiber optic cables. Moreover, as discussed above, the transport signals 204 are sent on the twisted pair cables in a frequency band higher than the Ethernet signals. Therefore, the DAS 100 can be added on to the existing LAN network with little effect on the LAN network.

Although a single twisted pair cable 106 and corresponding AAU 104 and Ethernet device 116 are illustrated in FIG. 2, it should be understood that the configuration described with respect to FIG. 2 can be implemented on more than one twisted pair cable 106 that is connected to a host unit 102. Each such more than one twisted pair cable 106 would have a distinct AAU 104 coupled thereto with a distinct Ethernet device 116 coupled to each such AAU 104.

Due to bandwidth limitations of many twisted pair cables, the transport signal corresponds to a single cellular RF band (e.g., the transport signal is an IF version of a single band of cellular RF signals). In some situations, however, it may be desirable to provide service for a second cellular RF band. To accommodate such a situation, the DAS 100 is configurable to transport signals corresponding to a second cellular RF band on the twisted pair cable 106 between the host unit 102 and the AAU 104 instead of the Ethernet signals. In such a configuration, a first transport signal corresponding to a first cellular RF band is sent as in a higher frequency spectrum as discussed above with respect to FIG. 3 (e.g., in a bandwidth from 133 Mhz to 250 Mhz), and a second transport signal corresponding to a second cellular RF band is sent in a lower frequency spectrum (e.g., in a bandwidth below about 125 MHz).

Figure 4:
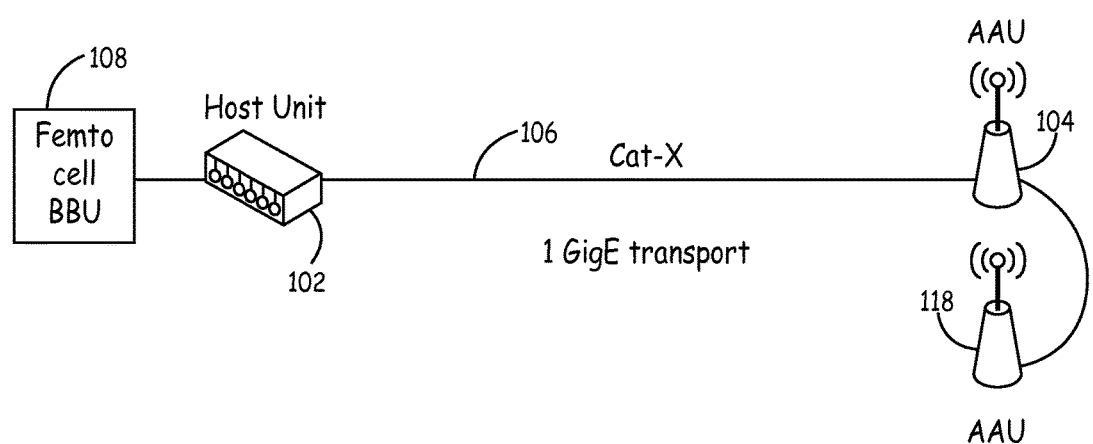
FIG. 4 is a block diagram of an example of a single twisted pair cable in the DAS of FIG. 1 wherein the DAS is set to transport a first transport signal corresponding to a first cellular RF band and a second transport signal corresponding to a second cellular RF band concurrently over the twisted pair cable.

FIG. 4 illustrates an example of a single twisted pair cable 106 in the DAS 100 wherein the DAS 100 is set to transport such a first transport signal and a second transport signal concurrently over the twisted pair cable 106. In such a setting, the (first) AAU 104 coupled to the twisted pair cable 106 is set to communicate a wireless RF signal in the first cellular RF band based on the first transport signal. This first AAU 104 is also set to pass the second transport signal between a second AAU 118 coupled to the first AAU 104 and the host unit 102.

The transport signal corresponding to the second cellular RF band can be generated in the same manner as the transport signal described with respect to FIG. 1. Thus, the host unit 102 communicates signals corresponding to the second cellular RF band with a RAN node 108 coupled to the host unit 102. This RAN node 108 can be the same RAN node 108 that communicates the signals corresponding to the first cellular RF band or a different RAN node 108 than communicates the signals corresponding to the first cellular RF band. In some examples, the same signals communicated between the RAN node 108 and the host unit 102 can correspond to the first cellular RF band and the second cellular RF band.

In any case, in the downlink, the host unit 102 receives a downlink signal corresponding to the second cellular RF band from a RAN node 108, and generates a second transport signal based on the downlink signal. The host unit 102 sends the second transport signal over the twisted pair cable 106 toward the first AAU 104 coupled to the twisted pair cable 106. The second transport signal is an IF version of the cellular RF band signal. The first AAU 104 passes the second transport signal to a second AAU 118. The second AAU receives the second transport signal, and generates an RF signal in the second cellular RF band from the second transport signal. The second AAU 118 wirelessly transmits the RF signal in the second cellular RF band from at least one antenna to a wireless device.

In the uplink, the second AAU 118 receives a wireless RF signal in the second cellular RF band at the at least one antenna from a wireless device. The second AAU 118 generates a second transport signal based on the RF signal received and sends the second transport signal toward the first AAU 104. The first AAU 104 passes the second transport signal to the twisted pair cable 106 toward the host unit 102. The host unit 102 receives the second transport signal and generates an uplink signal formatted for the RAN node 108 based on the second transport signal. The uplink signal corresponds to the wireless RF signal received at the second AAU 118. The host unit 102 sends the uplink signal to the RAN node 108.

Although a single twisted pair cable 106 and corresponding first AAU 104 and second AAU 118 are illustrated in FIG. 4, it should be understood that the configuration described with respect to FIG. 4 can be implemented on more than one twisted pair cable 106 that is connected to a host unit 102. Each such more than one twisted pair cable 106 would have a distinct first AAU 104 coupled thereto with a distinct second AAU 118 coupled to each such first AAU 104.

In any case, each second AAU 118 is configured to transmit a radio frequency signal in the second cellular radio frequency band to at least one wireless device using at least one antenna. In examples, each second AAU 118 is configured to transmit a downlink radio frequency signal to a wireless device using one or a set of antennas and another radio frequency signal to another wireless device using the one or set of antennas. In examples, each second AAU 108 is configured to transmit and receive a single band of RF signals at a time.

Similarly in the reverse/uplink path, in examples each second AAU 118 is configured to receive an uplink radio frequency (RF) signal from at least one wireless device using at least one antenna. Each second AAU 118 is further configured to convert the radio frequency signals to a second transport signal as described above.

Figure 5:
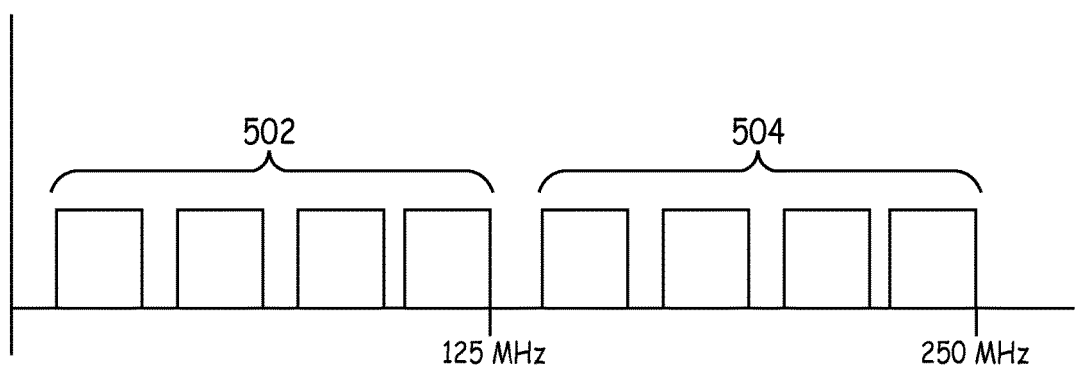
FIG. 5 is a graph illustrating example frequency spectrum of the twisted pair cable coupled between the host unit and the AAU of FIG. 4.

FIG. 5 illustrates an example graph of the frequency spectrum of the twisted pair cable 106 when transporting the first transport signal and the second transport signal concurrently. As shown, the first transport signals 504 are an IF version of first cellular RF band signals, wherein the IF signal is in a frequency band higher than the second transport signals 502, which are an IF version of second cellular RF band signals. In an example, the second transport signals 504 occupy the bandwidth below about 125 Mhz. The first transport signals 504 are sent in a bandwidth that is above 125 Mhz so the first transport signals 504 do not interfere with the second transport signals 502. In this example, the first transport signals 204 occupy the bandwidth from about 133 Mhz to 250 Mhz. In this way a bi-directional second transport signal 502 and a bi-directional first transport signal 504 can be sent on the twisted pair cable 106 at the same time.

Using the same twisted pair cable 106 for first transport signals 504 and second transport signals 502 is advantageous because it enables the DAS 100 to be implemented over an existing Ethernet network. For example, a building may have Ethernet cables already run to various locations throughout the building to provide wired or wireless local area network (LAN) service to those locations. In order to install a traditional DAS in the building coaxial or fiber optic cables would likely need to be run throughout the building, resulting in increased cost and time for the DAS installation. The DAS 100, however, can utilize the existing LAN cables to provide the transport between the host unit 102, the first AAU 104, and the second AAU 118, reducing or eliminating the expense and time required to run coaxial or fiber optic cables.

Accordingly, the DAS 100, and more generally the host unit 102 and the at least one AAU 104, can selectively communicate either Ethernet signals with a transport signal or two transport signals corresponding to respective cellular RF bands. To enable such selective communication, the host unit 102 and AAU(s) 104 are configurable into either a first state for communicating Ethernet signals with a transport signal (as described above) or a second state for communicating two transport signals corresponding to respective cellular RF bands (as described above). Such configuration enables the DAS 100 to be adaptable to customer desires.

As described above with respect to FIGS. 1, 2, and 4, a single host unit 102 can, and often does, have multiple twisted pair cables 106 coupled thereto. Each such twisted pair cable 106 can have a distinct AAU 104 coupled to the other end of such a cable 106. In some examples, the same set of signals (e.g., an Ethernet signal with a transport signal or a first transport signal with a second transport signal) is sent over each such twisted pair cable 106 coupled to the host unit 102. In other examples, one or more of the twisted pair cables have an Ethernet signal with a transport signal sent over, while one or more other twisted pair cables have a first transport signal with a second transport signal sent over.

Moreover, in examples with multiple twisted pair cables 106 coupled between a single host unit 102 and respective AAUs 104, and where Ethernet signals are sent over more than one of the multiple twisted pair cables 106, an Ethernet signal sent over a first twisted pair cable 106 can carry the same content or different content than an Ethernet signal sent over a second twisted pair cable 106. Similarly, a transport signal (first or second) sent over a first twisted pair cable 106 can carry the same or different content and can correspond to the same or a different cellular RF band than a transport signal sent over a second twisted pair cable 106. In summary, in some examples, a host unit 102 (and more generally a DAS 100) can configure each twisted pair cable 106 coupled between a host unit 102 and a respective AAU 104 individually to transport the desired signals.

Figure 6:
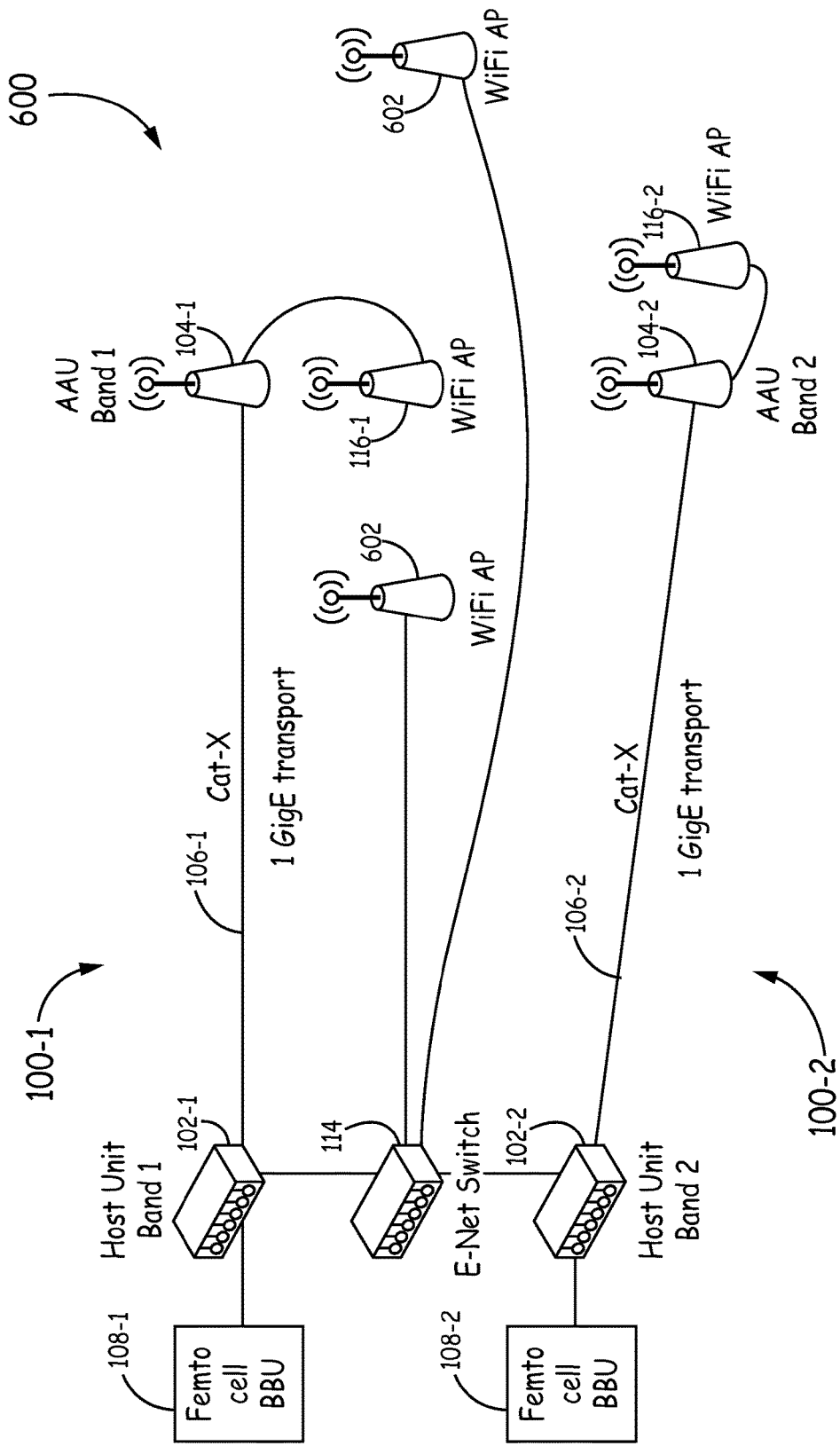
FIG. 6 is a block diagram of an example network including two DASs utilizing respective twisted pair cables to transport signals to respective AAUs.

FIG. 6 is an example of a network 600 including two DASs 100-1, 100-2 utilizing respective twisted pair cables 106-1, 106-2 to transport signals to respective AAUs 104-1, 104-2. In this example, the host unit 102-1, 102-2 of each DAS 100-1, 100-2 is coupled to a respective RAN node 108-1, 108-2. In this example, each host unit 102-1, 102-2 communicates a respective signal corresponding to a respective cellular RF band with the respective RAN node 108-1, 108-2. Each host unit 102-1, 102-2 also communicates a transport signal for the respective cellular RF band with a respective AAU 104 coupled to the respective host unit 102-1, 102-2 over the respective twisted pair cable 106.

In this example, the host units 102-1, 102-2 are also communicatively coupled to a first Ethernet device 114, and pass respective Ethernet signals between the first Ethernet device 114 and a respective first twisted pair cable 106. In particular, the first host unit 102-1 is configured to pass Ethernet signals sent and received between a second Ethernet device 116-1 and the first Ethernet device 114. The first host unit 102-1 is configured to couple Ethernet signals concurrently with the transport signals on the first twisted pair cable 106-1 toward the first AAU 104-1. The first AAU 104-1 is configured to communicate a wireless RF signal in a first cellular RF band based on the transport signals. The first AAU 104-1 is also configured to pass through the Ethernet signals to the second Ethernet device 116-1 that is coupled to the first AAU 104-1.

Similarly, the second host unit 102-2 is configured to pass Ethernet signals sent and received between a third Ethernet device 116-2 and the first Ethernet device 114. The second host unit 102-2 is configured to couple Ethernet signals concurrently with the transport signals on the second twisted pair cable 106-2 toward the second AAU 104-2. The second AAU 104-2 is configured to communicate a wireless RF signal in a second cellular RF band based on the transport signals. The second AAU 104-2 is also configured to pass through the Ethernet signals to the third Ethernet device 116-2 that is coupled to the second AAU 104-2.

Although in this example, the first and second DAS 100-1, 100-2 are shown with a respective single twisted pair cable 106-1, 106-2, it should be understood that more than one twisted pair cable 106 and corresponding AAU 104 and Ethernet device 118 can be coupled to a respective host unit 102 as described above. Moreover, although in this example, each DAS 100-1, 100-2 is configured to transport Ethernet signals along with transport signals over the respective twisted pair cable 106, it should be understood that either or both DASs 100-1, 100-2 can be configured to transport two transport signals corresponding to two different cellular RF bands over a given twisted pair cable 106. Any of the other options discussed above with respect to FIGS. 1, 2, and 4 are also possible.

As shown, in addition to being coupled to an Ethernet device 118 through the DASs 100-1, 100-2, the first Ethernet device 114 can also be coupled "directly" (i.e., not through a DAS 100-1, 100-2) to one or more other Ethernet devices 602. Such other Ethernet devices 602 can be coupled to the first Ethernet device 114 in any suitable manner (i.e., using respective twisted pair cables 106).

Figure 7:
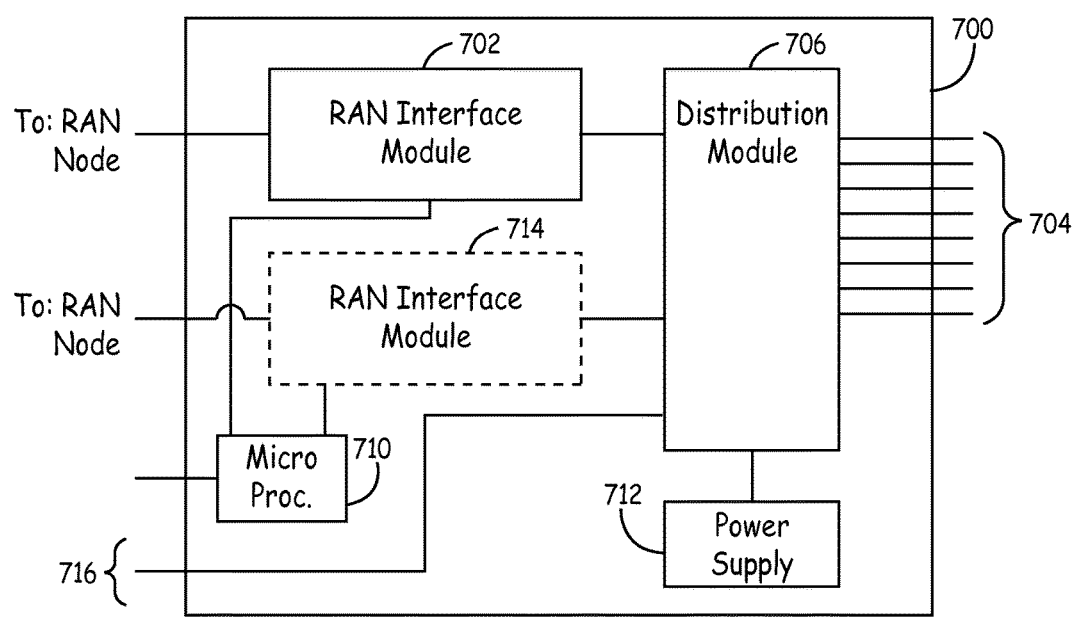
FIG. 7 is a block diagram of an example host unit of FIGS. 1, 2, and 4.

FIG. 7 is a block diagram of an example host unit 700 that could be used as host unit 102. The host unit 700 includes a RAN interface module 702 that is configured to convert between signals communicated with a RAN node 108 (e.g., base station) and transport signals sent over a twisted pair cable 106. Any suitable connector can be used to couple the host unit 700 to a RAN node 108, including an optical connector such as an SFP connector. In an example, the RAN interface module 702 is an electronic component that is physically installed in the host unit 700 via a non-permanent connection such as a bolt, screw, or other connection. The RAN interface module 702 includes suitable electronics to perform the bi-direction conversion of signals between the RAN node 108 and the twisted pair cable 106. In an example, such suitable electronics include appropriate mixers, local oscillators, filters, and gain blocks.

In the downlink, a downlink transport signal generated by the RAN interface module 702 is provided to a distribution module 706 which couples the downlink transport signal to one or more downstream RJ45 jacks 704. In the uplink, the distribution module 706 couples one or more uplink transport signals from the one or more RJ45 jacks 704 to the RAN interface module 702.

The distribution module 706 includes a plurality of internal non-permanent connectors for coupling the distribution module 706 to one or more RAN interface modules. The RAN interface module 702 also includes an internal non-permanent connector for coupling to the distribution module 706. An internal non-permanent connector is a connector that is intended to be easily connected and disconnected. Examples of such a non-permanent connector include a coaxial cable screw type connector, an RJ45 jack, or other similar connector. In an example, the internal non-permanent connector of the RAN interface module 702 is a mating connector to the internal non-permanent connector of the distribution module 706. In another example, a cable (e.g., a coaxial cable) is connected between the internal non-permanent connector of the RAN interface module 702 and the internal non-permanent connector of the distribution module 706.

Since the distribution module 706 includes a plurality of internal non-permanent connectors, a second RAN interface module 714 can be installed in the host unit 700 and coupled to the distribution module 706 to provide service for a second cellular RF band as discussed above. Such a second RAN interface module 714 is installed in the host unit 700 via a non-permanent physical connection such as a plurality of screws. Similar to the RAN interface module 702, the second RAN interface module 714 includes an internal non-permanent connector for coupling to the distribution module 706. In an example, this internal non-permanent connector is a mating connector to an internal non-permanent connector of the distribution module 706. In another example, a cable (e.g., a coaxial cable) is connected between the internal non-permanent connector of the second RAN interface module 714 and an internal non-permanent connector of the distribution module 706.

Similar to the RAN interface module 702, the second RAN interface module 714 is configured to convert between signals communicated with a RAN node 108 (e.g., base station) and transport signals sent over a twisted pair cable 106. The RAN node 108 with which the second RAN interface module 714 communicates can be the same or a different RAN node 108 than communicates with the RAN interface module 702. The RAN interface module 702 includes suitable electronics to perform the bi-direction conversion of signals between the RAN node 108 and the twisted pair cable 106. In an example, such suitable electronics include appropriate mixers, local oscillators, filters, and gain blocks.

In the downlink, a downlink transport signal generated by the second RAN interface module 714 is provided to the distribution module 706 which couples the downlink transport signal to one or more downstream RJ45 jacks 704. In the uplink, the distribution module 706 couples one or more uplink transport signals from the one or more RJ45 jacks 704 to the second RAN interface module 714.

Since the second RAN interface module 714 is installed in the host unit 700 and coupled to the distribution module 706 via non-permanent connections, the second RAN interface module 714 is an optional component of the host unit 700 that is installed in order to configure the host unit 700 into the dual-cellular RF band transport. In this configuration, the (first) RAN interface module 702 converts between signals corresponding to a first cellular RF band that are communicated with a RAN node 108 and a first transport signal, wherein the first transport signal is sent in a higher frequency spectrum as discussed above with respect to FIG. 3 (e.g., in a bandwidth from 133 Mhz to 250 Mhz). The second RAN interface module 714 converts between signals corresponding to a second cellular RF band that are communicated with a RAN node 108 and a second transport signal, wherein the second transport signal is sent in a lower frequency spectrum (e.g., in a bandwidth below about 125 MHz).

In such a configuration, the distribution module 706 couples both the downlink portion of the first transport signal and the downlink portion of the second transport signal to one or more twisted pair cables 106 connected to the one or more downstream RJ45 jacks 704. In the uplink, the distribution module 706 extracts the uplink portion of the first transport signal from the one or more twisted pair cables 106 and couples it to the first RAN interface module 702. To extract the uplink portion of the first transport signal, the distribution module 706 can include a high pass filter set to allow the higher frequency spectrum of the first transport signal to pass and to block the lower frequency spectrum of the second transport signal. The distribution module 706 also extracts the second transport signal from the one or more twisted pair cables 106 and couples it to the second RAN interface module 714. To extract the uplink portion of the second transport signal, the distribution module 706 can include a low pass filter set to allow the lower frequency spectrum of the second transport signal to pass and to block the higher frequency spectrum of the first transport signal. In other embodiments, the extraction of the appropriate uplink portion occurs in the RAN interface module.

Instead of having a second RAN interface module 714 installed in the host unit 700, the host unit 700 can be configured to transport Ethernet signals along with the first transport signal as discussed above. In such a configuration, one or more of the internal non-permanent connectors can be coupled to one or more upstream RJ45 jacks 716. Each of the one or more upstream RJ45 jacks 716 can have a first Ethernet device 114 communicatively coupled thereto via a respective twisted pair cable. In such a configuration, the distribution module 706 couples the transport signal from the RAN interface module 702 along with one or more Ethernet signals from the one or more upstream RJ45 jacks 716 to the one or more downstream RJ45 jacks 704 for transport on one or more twisted pair cables 106 to one or more AAUs 104. In the uplink, the distribution module 706 extracts the uplink portion of the transport signal from the one or more twisted pair cables 106 and couples it to the RAN interface module 702. To extract the uplink portion of the transport signal, the distribution module 706 can include a high pass filter set to allow the higher frequency spectrum of the transport signal to pass and to block the lower frequency spectrum of the Ethernet signal(s). The distribution module 706 also extracts the Ethernet signal(s) form the one or more twisted pair cables 106 and couples it/them to the one or more upstream RJ45 jacks 716. To extract the one or more Ethernet signals, the distribution module 706 can include a low pass filter set to allow the lower frequency spectrum of the Ethernet signals to pass and to block the higher frequency spectrum of the transport signal.

In an example, each twisted pair cable 106 has the same downlink transport signal thereon, however, each twisted pair cable 106 can have a distinct Ethernet signal thereon. That is, a distinct Ethernet communication channel can be provide between each distinct second Ethernet device 118 and the first Ethernet device 114, wherein each distinct Ethernet communication channel is provided over a respective twisted pair cable 106. In such an example, the uplink transport signals can be distinct as they are based on distinct received signals from distinct AAUs 104, however, the cellular RF band portion of the upstream transport can be combined (e.g., passively) in the distribution module 706 to generate a composite signal that is provided to the RAN interface module 704.

In some examples, an intermediate or expansion unit (not shown) may be coupled between the host unit 102 and multiple AAUs 104. Such an intermediate or expansion unit can be configured to combine the cellular RF band portion from multiple uplink signals from multiple AAUs 104 and to send a transport signal including the combined cellular RF band portion to the host unit 102. Such an intermediate unit can also be configured to copy or split the cellular RF band portion in a downlink signal from the host unit 102 into multiple downlink signals which are sent to the respective AAUs 104 or sets thereof in the multiple AAUs 104. The Ethernet portion of the uplink transport signals, however would not be combined if more than one of the uplink transport signals included an Ethernet portion. In such a situation, the intermediate device includes an Ethernet device such as an Ethernet switch or router to individually couple each Ethernet portion of each uplink transport signal to a distinct communication path (e.g., distinct twisted pair cable) to the host unit 102 and/or to another IP device. Similarly, in the downlink, distinct communication paths are maintained for each Ethernet signal from the host unit 102 and/or other IP devices to a given AAU 104.

In a first example, the RAN interface module 702 is configured to communicate CPRI signals (i.e., signals conforming to the CPRI specification) with the RAN node 108. The CPRI signals correspond to a first cellular RF band. In the downlink of the first example, the CPRI signals are received by the RAN interface module 702, and the RAN interface module 702 converts the CPRI signals to an IF version of the first cellular RF band corresponding to the CPRI signals. This IF signal is provided to the distribution module 706 for coupling to the one or more twisted pair cables 106. In the uplink of this first example, an IF version of uplink cellular RF band signals is received from the distribution module 706, and the RAN interface module 702 generates CPRI signals based on the IF signals from the distribution module 706.

In an example, instead of passing through Ethernet signals to/from the first Ethernet device 114, the host unit 700 includes an Ethernet switch that is configured to communicate Ethernet signals with the first Ethernet device 114. In the downlink, the Ethernet switch is configured to receive Ethernet signals from the first Ethernet device 114, determine which at least one downstream RJ45 jack 704 the Ethernet signals correspond to, and generate and transmit Ethernet signals based on the received Ethernet signals. The downlink Ethernet signals transmitted by the Ethernet switch 114 are sent over one or more of the downstream RJ45 jacks 704 based on the second Ethernet device 116 communicatively coupled to the respective twisted pair cable 106 that is connected to that jack 704. The downlink Ethernet signals generated by the Ethernet switch 708 are provided to the distribution module 706 which passively combines the Ethernet signal to be sent to a given connector with the transport signal to be sent to that downstream RJ45 jack 704. Since the Ethernet signal is in a distinct frequency band from the transport signal, the distribution module 706 can frequency combine the two signals.

When the host unit 700 has a second RAN interface module 714 installed therein to send a second transport signal corresponding to a second cellular RF band along with a first transport signal corresponding to a first cellular RF band over a twisted pair cable 106, the second RAN interface module 714 can convert between an analog transport signal (IF version of a cellular RF band) and the signals communicated with a RAN node 108 as discussed above. In examples where the transport signals are simulcast, both the first and second transport signals can be simulcast to all of the one or more downstream RJ45 jacks 704.

The host unit 700 also includes a microprocessor 710 that is configured to send and receive management signals (e.g., with a remotely located management system or with a locally connected device such as a technician's laptop) for control of the host unit 700. In an example, such management signals can be used to set the host unit 700 into either the first configuration which communicates Ethernet signals with transport signals on a given twisted pair cable 106 or a second configuration which communicates two transport signals on a given twisted pair cable 106. The microprocessor 710 can also be configured to send and receive management signals over the twisted pair cable 106 with an AAU 104. Such management signals can be in-band (e.g., imbedded in a transport signal) or out-of-band signals. One example of such a management signal includes a signal indicating whether the AAU 104 is to be set into a first state or a second state, where the first state corresponds to an Ethernet signal along with a transport signal on the twisted pair cable 106 and the second state corresponds to two transport signals on the twisted pair cable 106. In this way, the host unit 102 can control the state of each at least one AAU 104 coupled thereto.

The host unit 700 also includes a power supply to provide a power signal on the at least one twisted pair cable 106 as discussed above. The power signal is provided on the at least one twisted pair cable 106 to provide operating power for the AAU 104, second Ethernet device 116 or second AAU 118 communicatively coupled to the twisted pair cable 106. In an example, the power signal complies with a power-over-Ethernet standard.

In a second example, the RAN interface module 702 is configured to communicate RF signals with the RAN node 108. The RF signals correspond to a first cellular RF band. In the downlink of the second example, the RF signals are received by the RAN interface module 702, and the RAN interface module 702 converts the RF signals to an IF version of the first cellular RF band corresponding to the RF signals. This IF signal is provided to the distribution module 706 for coupling to the one or more twisted pair cables 106. In the uplink of this second example, an IF version of uplink cellular RF band signals is received from the distribution module 706, and the RAN interface module 702 generates RF signals based on the IF signals from the distribution module 706.

In an example, a host unit 700 includes multiple upstream RJ 45 jacks 716 for connecting with corresponding plugs on respective twisted pair cable. Each such jack 716 can connect to a respective twisted pair cable that can transport Ethernet signals between the host unit and a respective first Ethernet device 114 or a respective port on a given Ethernet device 114. Since each such jack 716 can be connected to a different first Ethernet device 114 or a different port of a given Ethernet device 114, distinct TCP/IP data can be communicated through each such jack 716. Moreover, as discussed above, multiple second Ethernet devices 116 can be coupled to respective AAUs 104 which are coupled to the host unit 700 via respective twisted pair cables 106. Accordingly, distinct TCP/IP data can be communicated over each twisted pair cable 106 to each distinct second Ethernet device 116.

To enable such distinct TCP/IP data to be communicated between multiple first Ethernet devices 114 (or ports thereof) and multiple second Ethernet devices 116, the host unit 700 can individually couple the Ethernet signals received at respective upstream RJ45 jacks 716 to corresponding twisted pair cable 106 for transport to a respective AAU 104. In an example, the host unit 700 maintains a static relationship between the upstream RJ45 jacks 716 over which signals are sent/received with respective first Ethernet devices 114 and the multiple downstream RJ45 jacks 704 over which signals are sent/received from the AAUs 104. In an example, this static relationship is a one-to-one relationship such that each upstream RJ45 jack is coupled to single downstream RJ45 jack 704.

For example, a first upstream RJ45 jack 716 through which signals are sent/received from a first Ethernet device 114 can be coupled by the host unit 700 to a first twisted pair cable 106 over which signals are sent/received with a first AAU 104, such that TCP/IP data received through the first upstream RJ45 jack 716 is sent over the first twisted pair cable 106 and TCP/IP data received over the first twisted pair cable 106 is sent over the first upstream RJ45 jack 716.

In such an example, a second upstream RJ45 jack 716 through which signals are sent/received from a different first Ethernet device 114 can be coupled by the host unit 700 to a second twisted pair cable 106 over which signals are sent/received with a second AAU 104, such that TCP/IP data received through the second upstream RJ45 jack 716 is sent over the second twisted pair cable 106 and TCP/IP data received over the second twisted pair cable 106 is sent over the second RJ45 jack 716. Such a one-to-one relationship can exist for each upstream RJ45 jack 716 through which signals are sent/received with a first Ethernet device 114 and a paired twisted pair cable 106 over which signals are sent/received with an AAU 104. In other examples, the relationship between a jack through which signals are sent/received with a first Ethernet device 114 and a paired twisted pair cable 106 over which signals are sent/received with an AAU 104 is other than one-to-one, and the host unit 700 couples the TCP/IP data accordingly.

Figure 8:
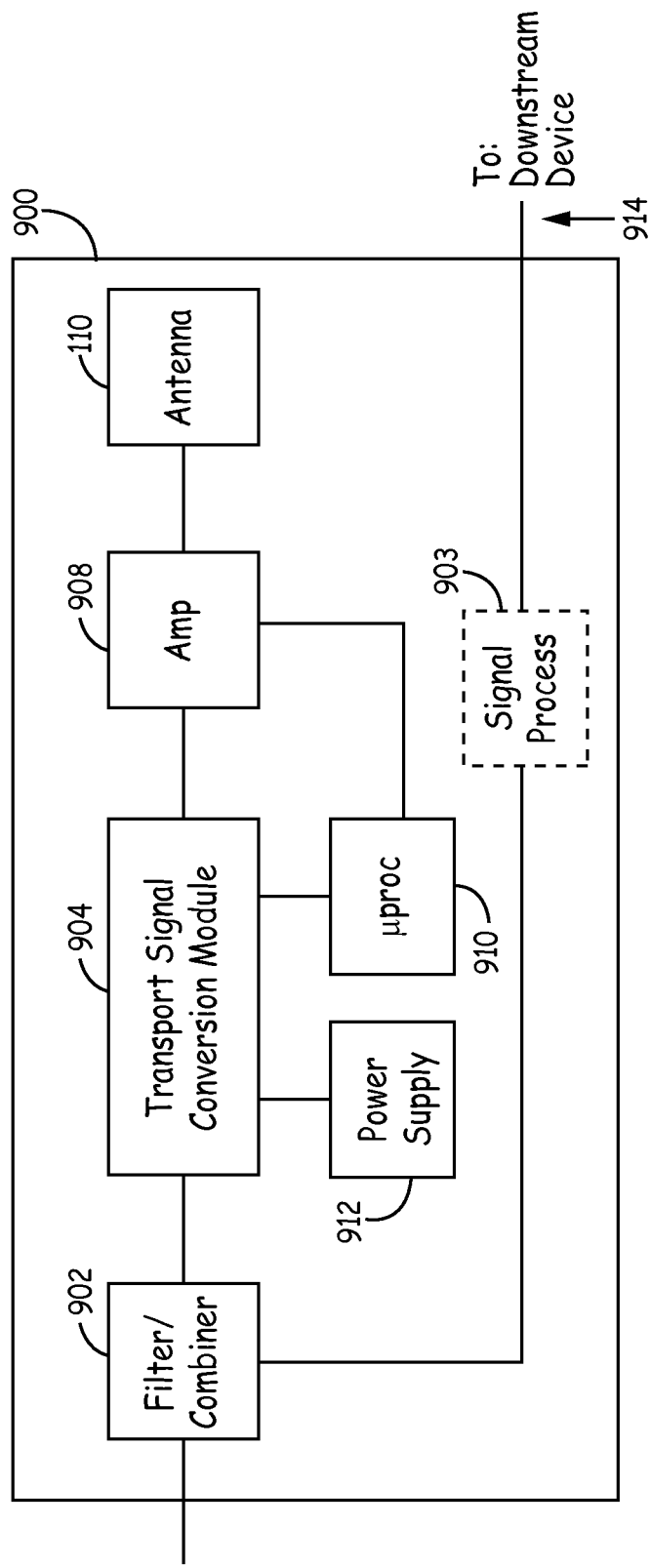
FIG. 8 is a block diagram of an example AAU of FIGS. 1, 2, and 4.

FIG. 8 is a block diagram of an example active antenna unit (AAU) 104. The AAU 104 includes a filter/combiner 902 configured to pass the downlink first transport signals to a transport signal conversion module 904 and to pass either an Ethernet signal or a second transport signal to a device coupled downstream of the AAU 104. The filter/combiner 902 along with the transport signal conversion module 904 (discussed below) makes up the host interface of the AAU 104. In an example, an RJ45 connector is coupled to the filter/combiner 902 and is configured to connect with a twisted pair cable 106 (e.g., an Ethernet cable). The filter/combiner 902 can comprise a high pass filter that blocks the Ethernet signal or second transport signal and passes the (first) transport signal to the transport signal conversion module 904. The filter/combiner 902 can also comprise a low pass filter that blocks the (first) transport signal and passes the Ethernet signal or second transport signal to an RJ45 jack 716 for the downstream device.

Advantageously, a low pass and high pass filter can operate similarly whether the AAU 104 is set for a transport signal with an Ethernet signal on the twisted pair cable 106 or is set for two transport signals on the twisted pair cable 106. Since the Ethernet signal or second transport signal would both occupy the lower bandwidth of the twisted pair cable 106, either signal will be passed by the low pass filter to a connector for a downstream device. In an example, the same RJ45 jack 914 is used to couple either the downstream Ethernet device 116 or the second AAU 118 to the first AAU 104. In another example, different connectors are used for an Ethernet device 116 and a second AAU 118 and a switch is included to direct the low frequency spectrum output from the filter/combiner 902 to the respective connector depending on which configuration the AAU 104 is set in.

In an example, when the AAU 104 is set to pass an Ethernet signal to the downstream device, the AAU 104 does not modify the Ethernet signal and passes the Ethernet signal through the AAU 104 to the RJ45 jack 914 for the downstream device. In an example, when the AAU 104 is set to pass a second transport signal to the downstream device, the AAU 104 is configured to signal process 903 the second transport signal for gain adjustment or flatness adjustment, if needed, the signal for further transport to the second AAU 118. The second transport signal, however, is not demodulated and processed to obtain the information. Other signal processing 903 may be performed instead of, or in addition to the gain adjustment or flatness adjustment. The low-pass filter/combiner 902 along with any optional signal processing 903 make up a pass-through interface for the AAU 104.

In any case, the first downlink transport signal is provided from the filter/combiner 902 to a transport signal conversion module 904. The transport signal conversion module 904 converts the IF version of a cellular RF band on the twisted pair cable 106 to a cellular RF band signal. The cellular RF band signal is provided to amplifier 908. The amplifier 908 amplifies the RF signal for transmission and sends the amplified RF signal to an antenna for radiating therefrom.

In the uplink, the antenna senses an RF signal and the signal propagates down the antenna to the amplifier 908. The amplifier 908 amplifies the received RF signal and provides the amplified RF signal to the transport signal conversion module 904. The transport signal conversion module 904 down-converts the RF signal to an IF signal sends the IF signal to the filter/combiner 902 which combines the transport signal with an Ethernet signal or second transport signal from a downstream device. This IF signal is in a frequency spectrum higher than the frequency spectrum of the Ethernet signal or second transport signal. The signal from a downstream device can be either an Ethernet signal or a second transport signal. Since either an Ethernet signal or second transport signal in a distinct frequency band from the first transport signal, the filter/combiner 902 can frequency combine the signals for the twisted pair cable 106.

The AAU 104 can also include a power supply 912 coupled to the connector for the twisted pair cable 106. The power supply 912 is configured to obtain power from the power signal sent on the twisted pair cable 106 by the host unit 102. The power obtained by the power supply 912 is provided to components of the AAU 104 to operate the AAU 104. The power supply 912 can also be configured to provide a second power signal on a twisted pair cable connected to a connector for a downstream device. In an example, such a second power signal can conform to a power-over-Ethernet standard.

Since two AAUs 104, 118 connected in series may require more power than a downstream Ethernet device 116 coupled in series with an AAU 104, in an example, the AAU 104 and the host unit 102 is can be set into one of two power supply states. The host unit 102 and the AAU 104 are set into the first power supply state when an Ethernet device 118 is coupled downstream of the AAU 104, which is also when an Ethernet signal is sent with a transport signal on the twisted pair cable 106. In such a first power supply state, the host unit 102 is set to provide a lesser amount of power than if the downstream device were a second AAU 118. In the first power supply state, the AAU 104 is also set to provide a lesser amount of power than if the downstream device were a second AAU 118. The host unit 102 and the AAU 104 are set into the second power supply state when a second AAU 118 is coupled downstream of the AAU 104, which is also when two transport signals are sent on the twisted pair cable 106. In such a second power supply state, the host unit 102 and the AAU 104 provide a greater amount of power than if the downstream device were an Ethernet device 116. The lesser and greater amount of power can be provided by a power signal in any appropriate manner such as by a signal power signal from the host unit 102 when lesser amount of power is required and two power signals from the host 102 when a greater amount of power is provided.

The AAU 104 can also include a microprocessor 910 coupled to one or more of the transport signal conversion module 904 and amplifier 908. The microprocessor 910 can be configured to send and receive management (e.g., control) signals with the host unit 102 or another remote device over the twisted pair cable 106. The microprocessor 910 can be configured to adjust one or more of the transport signal conversion module 904 and amplifier 908 based on the management signals. In an example, the microprocessor 910 can be configured to set the AAU 104 into either the first state where an Ethernet signal is sent with a transport signal over the twisted pair cable 106 and, optionally, where a lesser amount of power is provided to a downstream device. In the second state, a first transport signal and a second transport signal are sent over a twisted pair cable 106 and, optionally, a greater amount of power is provided to a downstream device.

A second AAU 118 coupled to the pass-through interface of the first AAU 104 can include similar components to that shown in FIG. 9 except such a second AAU 118 would not include filter/combiner or a pass-through interface as described. Additionally, instead of communicating wireless RF signals corresponding to a passband transport signal, the second AAU 118 communicates wireless RF signals corresponding to a baseband transport signal. Accordingly, any filter coupled to a host interface of the second AAU 104, and the transport signal conversion module of the second AAU 118 are configured to operate on such baseband signals.

In exemplary embodiments, cellular RF signals may utilize various wireless protocols and in various bands of frequency spectrum. For example, the cellular RF signals may include, but are not limited to, licensed RF bands, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. The system described herein are capable of transporting both Single Input Single Output (SISO) and Multiple Input Multiple Output (MIMO) services at any of the frequencies described above. The systems described herein can support any combination of SISO and MIMO signals across various bands of frequency spectrum. In some example embodiments, the systems described herein may provide MIMO streams for WiMAX, LTE, and HSPA services while only providing SISO streams for other services. Other combinations of MIMO and SISO services are used in other embodiments.

In an alternative example, the DAS 100, and more generally the host unit 102 and the at least one AAU 104, can selectively communicate either Ethernet signals with a transport signal or two transport signals corresponding to respective licensed RF bands. To enable such selective communication, the host unit 102 can include a switch that selectively couples either the Ethernet signals or the second transport signal to/from the one or more twisted pair cables 106. Such a switch can be coupled between the RAN interface(s) and the distribution component of the host unit 102, and can be coupled between the one or more upstream RJ45 jacks and the distribution component. Such a RAN interface can function the same as a RAN interface module 702 or 714 described above, but can be selectively coupled to the distribution component using the switch. Additionally, the distribution component can function the same as the distribution module 706 discussed above. In some implementations of such an alternative example, the RAN interface(s), switch, and distribution component can be permanently connected to one another. In some implementations, the switch and the distribution component can be implemented with a single component or set of components.

The state (i.e., which signals are coupled to/from the one or more twisted pair cables 106) of such a switch can be modified by, for example, firmware or other instructions implemented on the host unit 102. For example, a command to set the state of a switch can be received at the host unit 102 from a remote device communicatively coupled to the host unit 102 over a network. In another example, a local device can interact with the host unit 102 to set the state of the switch. In yet another example, the host unit 102 can include a human interface (e.g., button, touchscreen, etc.) that is configured to receive an input to set the state of the switch. Such a switch enables the host unit 102 to be field configurable into either a first state for communicating Ethernet signals with a transport signal (as described above) or a second state for communicating two transport signals corresponding to respective licensed RF bands (as described above). Such field configuration enables the DAS 100 to be adaptable to customer desires and/or changes over time. The AAU(s) 104 can also be field configurable in a similar and corresponding manner.

In examples, any of the processors described above may include or function with software programs, firmware or other computer readable instructions for carrying out various methods, process tasks, calculations, and control functions, used in the digital processing functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a distributed antenna system (DAS) comprising: a host unit including: a first radio access network (RAN) interface module to communicate with a RAN node, first signals corresponding to a first cellular radio frequency (RF) band, the first RAN interface module configured to convert between the first signals and first transport signals, wherein the first transport signals are in a first frequency spectrum; a distribution module coupled to the first RAN interface module, the distribution module configured to distribute the first transport signals between one or more downstream RJ45 connectors and the first RAN interface module; and one or more non-permanent connectors to couple the distribution module to a second RAN interface module and a set of one or more upstream RJ45 jacks, wherein the second RAN interface module is configured to communicate with a RAN node, second signals corresponding to a second cellular RF band and to convert between the second signals and second transport signals, wherein the set of one or more upstream RJ45 jacks are configured to pass Ethernet signals therethrough; wherein the distribution module is configured to couple a downlink portion of the first transport signals and either a downlink portion of the second transport signals or a downlink Ethernet signal from one of the upstream RJ45 jacks to a first twisted pair cable connected to one of one or more downstream RJ45 jacks, wherein the distribution module is configured to couple an uplink portion of the first transport signals on the first twisted pair cable to the first RAN interface module and to couple either an uplink portion of the second transport signals or an uplink Ethernet signal from the first twisted pair cable to the one or more non-permanent connectors, wherein the first frequency spectrum of the first transport signals is non-overlapping with a frequency spectrum of the second transport signals and with a frequency spectrum of the uplink and downlink Ethernet signals, wherein an uplink or downlink portion of the first transport signals is communicated concurrently with an uplink or downlink portion of the either the second IF signals or the uplink and downlink Ethernet signals over the first twisted pair cable; and a first active antenna unit (AAU) including: a host unit interface communicatively coupled to the host unit over the first twisted pair cable and to communicate the first transport signals and either the second transport signals or the uplink and downlink Ethernet signals over the first twisted pair cable, the first AAU configured to communicate first wireless RF signals in the first cellular RF band, the first wireless RF signals corresponding to the first transport signals communicated with the host unit; and a pass-through interface to pass either the second transport signals or the uplink and downlink Ethernet signals through the first AAU between the host unit and a downstream device.

Example 2 includes the distributed antenna system of Example 1, wherein only one of the second RAN interface module or the set of one or more upstream RJ45 jacks is coupled to the distribution module at a time.

Example 3 includes the distributed antenna system of any of Examples 1-2, wherein the pass-through interface is configured to interface over a second twisted pair cable with the downstream device.

Example 4 includes the distributed antenna system of Example 3, wherein the downstream device is a wireless access point having an Ethernet interface configured to communicate the Ethernet signals through the pass-through interface of the first AAU, wherein the set of one or more upstream RJ45 jacks are coupled to the non-permanent connectors of the distribution module to pass the uplink and downlink Ethernet signals between an upstream Ethernet device coupled to at least one of the set of one or more upstream RJ45 jacks and the first twisted pair cable such that the upstream Ethernet device and the wireless access point can communicate the uplink and downlink Ethernet signals over the first twisted pair cable.

Example 5 includes the distributed antenna system of any of Examples 3-4, wherein the downstream device is a second AAU having an interface configured to communicate the second IF signals with the host unit through the pass-through interface of the first AAU, the second AAU configured to communicate second wireless RF signals in the second cellular RF band, wherein the second wireless RF signals correspond to the second transport signals communicated with host unit, wherein the second RAN interface module is installed in the host unit to communicate the second transport signals with the second AAU.

Example 6 includes the distributed antenna system of any of Examples 1-5, wherein the Ethernet signals include Ethernet frames of TCP/IP data and are in compliance with an IEEE Example 802.3 standard.

Example 7 includes the distributed antenna system of any of Examples 1-6, wherein the first twisted pair cable is a cable in compliance with one of the category 5, category 5e, category 6, category 6a, or category 7 specifications.

Example 8 includes the distributed antenna system of any of Examples 1-7, wherein the host unit is configured to provide a first power signal over the first twisted pair cable to the first AAU, wherein the first AAU is configured to use the first power signal for operating power.

Example 9 includes the distributed antenna system of Example 8, wherein the first AAU is configured to forward power from the first power signal as a second power signal to the downstream device.

Example 10 includes the distributed antenna system of Example 9, wherein the host unit is configured to send a signal to the first AAU indicating whether the downstream device is a wireless access point complying with an IEEE Example 802.11 standard or a second AAU.

Example 11 includes the distributed antenna system of Example 10, wherein if the downstream device is a second AAU, the host unit is configured to send a greater amount of power in the first power signal than if the downstream device were a wireless access point, wherein if the downstream device is a second AAU, the first AAU is configured to send a greater amount of power in the second power signal than if the downstream device were a wireless access point.

Example 12 includes the distributed antenna system of any of Examples 1-11, wherein the pass-through interface includes a filter configured to filter out a downlink portion of the first transport signals and pass a downlink portion of either the second transport signals or the Ethernet signals from the first twisted pair cable through the pass-through interface to the downstream device.

Example 13 includes the distributed antenna system of any of Examples 1-12, wherein the first signals corresponding to the first cellular RF band communicated by the first RAN interface module are RF signals in the first cellular RF band.

Example 14 includes the distributed antenna system of any of Examples 1-13, wherein the second signals corresponding to the second cellular RF band communicated by the second RAN interface module are RF signals in the second cellular RF band.

Example 15 includes the distributed antenna system of any of Examples 1-14, wherein the first signals corresponding to the first cellular RF band communicated by the first RAN interface module comply with the common public radio interface (CPRI) specification.

Example 16 includes the distributed antenna system of any of Examples 1-15, wherein the second signals corresponding to the second cellular RF band communicated by the second RAN interface module comply with the common public radio interface (CPRI) specification.

Example 17 includes the distributed antenna system of any of Examples 1-16, wherein the RAN node is one of a base station, a base transceiver station, or an internet protocol (IP) gateway.

Example 18 includes the distributed antenna system of any of Examples 1-17, wherein the first transport signals are intermediate frequency (IF) signals.

Example 19 includes the distributed antenna system of any of Examples 1-18, wherein the second transport signal are intermediate frequency (IF) signals.

Example 22 includes a host unit for a distributed antenna system, the host unit comprising: a first radio access network (RAN) interface module to communicate with a RAN node, first signals corresponding to a first cellular radio frequency (RF) band, the first RAN interface module configured to convert between the first signals and first transport signals, wherein the first transport signals are in a first frequency spectrum; a distribution module coupled to the first RAN interface module, the distribution module configured to distribute the first transport signals between one or more downstream RJ45 connectors and the first RAN interface module; and one or more non-permanent connectors to couple the distribution module to a second RAN interface module and a set of one or more upstream RJ45 jacks, wherein the second RAN interface module is configured to communicate with a RAN node, second signals corresponding to a second cellular RF band and to convert between the second signals and second transport signals, wherein the set of one or more upstream RJ45 jacks are configured to pass Ethernet signals therethrough; wherein the distribution module is configured to couple a downlink portion of the first transport signals and either a downlink portion of the second transport signals or a downlink Ethernet signal from one of the upstream RJ45 jacks to a first twisted pair cable connected to one of one or more downstream RJ45 jacks, wherein the distribution module is configured to couple an uplink portion of the first transport signals on the first twisted pair cable to the first RAN interface module and to couple either an uplink portion of the second transport signals or an uplink Ethernet signal from the first twisted pair cable to the one or more non-permanent connectors, wherein the first frequency spectrum of the first transport signals is non-overlapping with a frequency spectrum of the second transport signals and with a frequency spectrum of the uplink and downlink Ethernet signals, wherein an uplink or downlink portion of the first transport signals is communicated concurrently with an uplink or downlink portion of the either the second transport signals or the uplink and downlink Ethernet signals over the first twisted pair cable, wherein the first transport signals and either the second transport signal or the uplink and downlink Ethernet signals are sent between the host unit and a first active antenna unit (AAU) over the first twisted pair cable.

Example 23 includes the host unit of Example 22, wherein only one of the second RAN interface module or the set of one or more upstream RJ45 jacks is coupled to the distribution module at a time.

Example 24 includes the host unit of any of Examples 22-23, wherein if a wireless access point is coupled downstream of the first AAU, the set of one or more upstream RJ45 jacks are coupled to the non-permanent connectors of the distribution module to pass the uplink and downlink Ethernet signals between an upstream Ethernet device coupled to at least one of the set of one or more upstream RJ45 jacks and the first twisted pair cable such that the upstream Ethernet device and the wireless access point can communicate the uplink and downlink Ethernet signals over the first twisted pair cable.

Example 25 includes the host unit of any of Examples 22-24, wherein if a second AAU is coupled downstream of the first AAU, the second AAU configured to communicate second wireless RF signals in the second cellular RF band, wherein the second wireless RF signals correspond to the second transport signals communicated with host unit, wherein the second RAN interface is installed in the host unit to communicate the second transport signals with the second AAU.

Example 26 includes the host unit of any of Examples 22-25, wherein the Ethernet signals includes Ethernet frames of TCP/IP data and are in compliance with an IEEE Example 802.3 standard.

Example 27 includes the host unit of any of Examples 22-26, wherein the first twisted pair cable is a cable in compliance with one of the category 5, category 5e, category 6, category 6a, or category 7 specifications.

Example 28 includes the host unit of any of Examples 22-27, wherein the host unit is configured to provide a first power signal over the first twisted pair cable to the first AAU.

Example 29 includes the host unit of Example 28, wherein the host unit is configured to send a signal to the first AAU indicating whether a wireless access point complying with an IEEE Example 802.11 standard or a second AAU is coupled downstream of the first AAU.

Example 30 includes the host unit of Example 29, wherein if a second AAU is coupled downstream of the first AAU, the host unit is configured to send a greater amount of power in the first power signal than if the downstream device were a wireless access point.

Example 31 includes the host unit of any of Examples 22-30, wherein the first signals corresponding to the first cellular RF band communicated by the first RAN interface are RF signals in the first cellular RF band.

Example 32 includes the host unit of any of Examples 22-31, wherein the second signals corresponding to the second cellular RF band communicated by the second RAN interface are RF signals in the second cellular RF band.

Example 33 includes the host unit of any of Examples 22-32, wherein the first signals corresponding to the first cellular RF band communicated by the first RAN interface comply with the common public radio interface (CPRI) specification.

Example 34 includes the host unit of any of Examples 22-33, wherein the second signals corresponding to the second cellular RF band communicated by the second RAN interface comply with the common public radio interface (CPRI) specification.

Example 35 includes the host unit of any of Examples 22-34, wherein the RAN node is one of a base station, a base transceiver station, or an internet protocol (IP) gateway.

Example 36 includes the host unit of any of Examples 22-35, wherein the first transport signals are intermediate frequency (IF) signals.

Example 37 includes the host unit of any of Examples 22-36, wherein the second transport signal are intermediate frequency (IF) signals.

Example 40 includes a host unit for a distributed antenna system, the host unit comprising: a plurality of radio access network (RAN) interfaces to communicate with one or more RAN nodes, first signals corresponding to a first cellular radio frequency (RF) band and second signals corresponding to a second cellular RF band, wherein the plurality of RAN interfaces are configured to convert between the first signals and first transport signal and the second signals and second transport signals, wherein the first transport signals are in a first frequency spectrum and the second transport signals are in a second frequency spectrum; a distribution component configured to distribute the first and second transport signals between one or more downstream RJ45 connectors and the plurality of RAN interfaces and configured to distribute Ethernet signals sent over a set of one or more upstream RJ45 between the set of one or more upstream RJ45 connectors and the one or more downstream RJ45 connectors; and a switch coupled between the plurality of RAN interfaces and the distribution component and coupled between the set of one or more upstream RJ45 connectors and the one or more downstream RJ45 connectors, wherein the host unit is configured to couple a downlink portion of the first transport signals to a first twisted pair cable connected to one of the one or more downstream RJ45 jacks and to set the switch in either a first state or a second state, wherein in the first state the switch is set to couple a downlink portion of the second transport from one of the RAN interfaces to the first twisted pair cable and to couple an uplink portion of the second transport signal from the first twisted pair cable to the RAN interface, wherein in the second state the switch is set to couple a downlink Ethernet signal from one of the upstream RJ45 connectors to the first twisted pair cable and to couple an uplink Ethernet signal from the first twisted pair cable to the one of the upstream RJ45 connectors, wherein the first frequency spectrum of the first transport signals is non-overlapping with a frequency spectrum of the second transport signals and with a frequency spectrum of the uplink and downlink Ethernet signals, wherein an uplink or downlink portion of the first transport signals is communicated concurrently with an uplink or downlink portion of either the second transport signals or the uplink and downlink Ethernet signals over the first twisted pair cable, wherein the first transport signals and either the second transport signals or the uplink and the uplink and downlink Ethernet signals are sent between the host unit and a first active antenna unit (AAU) over the first twisted pair cable.

Example 41 includes the host unit of Example 40, wherein if a wireless access point is coupled downstream of the first AAU, the switch is set in the second state.

Example 42 includes the host unit of any of Examples 40-41, wherein if a second AAU is coupled downstream of the first AAU, the switch is set in the first state.

Example 43 includes the host unit of any of Examples 40-42, wherein the Ethernet signals include Ethernet frames of TCP/IP data and are in compliance with an IEEE Example 802.3 standard.

Example 44 includes the host unit of any of Examples 40-43, wherein the first twisted pair cable is a cable in compliance with one of the category 5, category 5e, category 6, category 6a, or category 7 specifications.

Example 45 includes the host unit of any of Examples 40-44, wherein the first signals corresponding to the first cellular RF band communicated by the first RAN interface are RF signals in the first cellular RF band, wherein the second signals corresponding to the second cellular RF band communicated by the second RAN interface are RF signals in the second cellular RF band.

Example 46 includes the host unit of any of Examples 40-45, wherein the first signals corresponding to the first cellular RF band communicated by the first RAN interface comply with the common public radio interface (CPRI) specification, wherein the second signals corresponding to the second cellular RF band communicated by the second RAN interface comply with the common public radio interface (CPRI) specification.

Example 47 includes the host unit of any of Examples 40-46, wherein the RAN node is one of a base station, a base transceiver station, or an internet protocol (IP) gateway.

Example 48 includes the host unit of any of Examples 40-47, wherein the first transport signals are intermediate frequency (IF) signals, wherein the second transport signal are intermediate frequency (IF) signals.

What is claimed is:

1. A distributed antenna system (DAS) comprising:
   a host unit including:
   a first radio access network (RAN) interface module to communicate with a RAN node, first signals corresponding to a first cellular radio frequency (RF) band, the first RAN interface module configured to convert between the first signals and first transport signals, wherein the first transport signals are in a first frequency spectrum;
   a distribution module coupled to the first RAN interface module, the distribution module configured to distribute the first transport signals between one or more downstream RJ45 connectors and the first RAN interface module; and
   one or more non-permanent connectors to couple the distribution module to a second RAN interface module and a set of one or more upstream RJ45 jacks, wherein the second RAN interface module is configured to communicate with a RAN node, second signals corresponding to a second cellular RF band and to convert between the second signals and second transport signals, wherein the set of one or more upstream RJ45 jacks are configured to pass Ethernet signals therethrough;
   wherein the distribution module is configured to couple a downlink portion of the first transport signals and either a downlink portion of the second transport signals or a downlink Ethernet signal from one of the upstream RJ45 jacks to a first twisted pair cable connected to one of one or more downstream RJ45 jacks, wherein the distribution module is configured to couple an uplink portion of the first transport signals on the first twisted pair cable to the first RAN interface module and to couple either an uplink portion of the second transport signals or an uplink Ethernet signal from the first twisted pair cable to the one or more non-permanent connectors,
   wherein the first frequency spectrum of the first transport signals is non-overlapping with a frequency spectrum of the second transport signals and with a frequency spectrum of the uplink and downlink Ethernet signals, wherein an uplink or downlink portion of the first transport signals is communicated concurrently with an uplink or downlink portion of the either the second transport signals or the uplink and downlink Ethernet signals over the first twisted pair cable; and
   a first active antenna unit (AAU) including:
   a host unit interface communicatively coupled to the host unit over the first twisted pair cable and to communicate the first transport signals and either the second transport signals or the uplink and downlink Ethernet signals over the first twisted pair cable, the first AAU configured to communicate first wireless RF signals in the first cellular RF band, the first wireless RF signals corresponding to the first transport signals communicated with the host unit; and
   a pass-through interface to pass both the second transport signals and the uplink and downlink Ethernet signals through the first AAU between the host unit and a downstream device, wherein the pass-through interface is configured to pass the second transport signals when the downstream device is a second AAU, wherein the pass-through interface is configured to pass the Ethernet signals when the downstream device is an Ethernet device.

2. The distributed antenna system of claim 1, wherein only one of the second RAN interface module or the set of one or more upstream RJ45 jacks is coupled to the distribution module at a time.

3. The distributed antenna system of claim 1, wherein the pass-through interface is configured to interface over a second twisted pair cable with the downstream device.

4. The distributed antenna system of claim 3, wherein the downstream device is a wireless access point having an Ethernet interface configured to communicate the Ethernet signals through the pass-through interface of the first AAU, wherein the set of one or more upstream RJ45 jacks are coupled to the non-permanent connectors of the distribution module to pass the uplink and downlink Ethernet signals between an upstream Ethernet device coupled to at least one of the set of one or more upstream RJ45 jacks and the first twisted pair cable such that the upstream Ethernet device and the wireless access point can communicate the uplink and downlink Ethernet signals over the first twisted pair cable.

5. The distributed antenna system of claim 3, wherein the downstream device is a second AAU having an interface configured to communicate the second transport signals with the host unit through the pass-through interface of the first AAU, the second AAU configured to communicate second wireless RF signals in the second cellular RF band, wherein the second wireless RF signals correspond to the second transport signals communicated with host unit,
   wherein the second RAN interface module is installed in the host unit to communicate the second transport signals with the second AAU.

6. The distributed antenna system of claim 1, wherein the Ethernet signals include Ethernet frames of TCP/IP data and are in compliance with an IEEE 802.3 standard.

7. The distributed antenna system of claim 1, wherein the first twisted pair cable is a cable in compliance with one of the category 5, category 5e, category 6, category 6a, or category 7 specifications.

8. The distributed antenna system of claim 1, wherein the host unit is configured to provide a first power signal over the first twisted pair cable to the first AAU,
   wherein the first AAU is configured to use the first power signal for operating power.

9. The distributed antenna system of claim 8, wherein the first AAU is configured to forward power from the first power signal as a second power signal to the downstream device.

10. The distributed antenna system of claim 9, wherein the host unit is configured to send a signal to the first AAU indicating whether the downstream device is a wireless access point complying with an IEEE 802.11 standard or a second AAU.

11. The distributed antenna system of claim 10, wherein if the downstream device is a second AAU, the host unit is configured to send a greater amount of power in the first power signal than if the downstream device were a wireless access point,
   wherein if the downstream device is a second AAU, the first AAU is configured to send a greater amount of power in the second power signal than if the downstream device were a wireless access point.

12. The distributed antenna system of claim 1, wherein the pass-through interface includes a filter configured to filter out a downlink portion of the first transport signals and pass a downlink portion of either the second transport signals or the Ethernet signals from the first twisted pair cable through the pass-through interface to the downstream device.

13. The distributed antenna system of claim 1, wherein the first signals corresponding to the first cellular RF band communicated by the first RAN interface module are RF signals in the first cellular RF band.

14. The distributed antenna system of claim 1, wherein the second signals corresponding to the second cellular RF band communicated by the second RAN interface module are RF signals in the second cellular RF band.

15. The distributed antenna system of claim 1, wherein the first signals corresponding to the first cellular RF band communicated by the first RAN interface module comply with the common public radio interface (CPRI) specification.

16. The distributed antenna system of claim 1, wherein the second signals corresponding to the second cellular RF band communicated by the second RAN interface module comply with the common public radio interface (CPRI) specification.

17. The distributed antenna system of claim 1, wherein the RAN node is one of a base station, a base transceiver station, or an internet protocol (IP) gateway.

18. The distributed antenna system of claim 1, wherein the first transport signals are intermediate frequency (IF) signals.

19. The distributed antenna system of claim 1, wherein the second transport signals are intermediate frequency (IF) signals.

20. A host unit for a distributed antenna system, the host unit comprising:
    a first radio access network (RAN) interface module to communicate with a RAN node, first signals corresponding to a first cellular radio frequency (RF) band, the first RAN interface module configured to convert between the first signals and first transport signals, wherein the first transport signals are in a first frequency spectrum;
    a distribution module coupled to the first RAN interface module, the distribution module configured to distribute the first transport signals between one or more downstream RJ45 connectors and the first RAN interface module; and
    one or more non-permanent connectors to couple the distribution module to a second RAN interface module and a set of one or more upstream RJ45 jacks, wherein the second RAN interface module is configured to communicate with a RAN node, second signals corresponding to a second cellular RF band and to convert between the second signals and second transport signals, wherein the set of one or more upstream RJ45 jacks are configured to pass Ethernet signals therethrough;
    wherein the distribution module is configured to couple a downlink portion of the first transport signals and either a downlink portion of the second transport signals or a downlink Ethernet signal from one of the upstream RJ45 jacks to a first twisted pair cable connected to one of one or more downstream RJ45 jacks, wherein the distribution module is configured to couple an uplink portion of the first transport signals on the first twisted pair cable to the first RAN interface module and to couple either an uplink portion of the second transport signals or an uplink Ethernet signal from the first twisted pair cable to the one or more non-permanent connectors,
    wherein the first frequency spectrum of the first transport signals is non-overlapping with a frequency spectrum of the second transport signals and with a frequency spectrum of the uplink and downlink Ethernet signals, wherein an uplink or downlink portion of the first transport signals is communicated concurrently with an uplink or downlink portion of the either the second transport signals or the uplink and downlink Ethernet signals over the first twisted pair cable,
    wherein the first transport signals and either the second transport signals or the uplink and downlink Ethernet signals are sent between the host unit and a first active antenna unit (AAU) over the first twisted pair cable, wherein the first AAU is configured to pass the second transport signals when a second AAU is coupled downstream of the first AAU, wherein the first AAU is configured to pass the Ethernet signals when an Ethernet device is coupled downstream of the first AAU.

21. The host unit of claim 20, wherein only one of the second RAN interface module or the set of one or more upstream RJ45 jacks is coupled to the distribution module at a time.

22. The host unit of claim 20, wherein if a wireless access point is coupled downstream of the first AAU, the set of one or more upstream RJ45 jacks are coupled to the non-permanent connectors of the distribution module to pass the uplink and downlink Ethernet signals between an upstream Ethernet device coupled to at least one of the set of one or more upstream RJ45 jacks and the first twisted pair cable such that the upstream Ethernet device and the wireless access point can communicate the uplink and downlink Ethernet signals over the first twisted pair cable.

23. The host unit of claim 20, wherein if a second AAU is coupled downstream of the first AAU, the second AAU configured to communicate second wireless RF signals in the second cellular RF band, wherein the second wireless RF signals correspond to the second transport signals communicated with host unit,
    wherein the second RAN interface is installed in the host unit to communicate the second transport signals with the second AAU.

24. The host unit of claim 20, wherein the Ethernet signals includes Ethernet frames of TCP/IP data and are in compliance with an IEEE 802.3 standard.

25. The host unit of claim 20, wherein the first twisted pair cable is a cable in compliance with one of the category 5, category 5e, category 6, category 6a, or category 7 specifications.

26. The host unit of claim 20, wherein the host unit is configured to provide a first power signal over the first twisted pair cable to the first AAU.

27. The host unit of claim 26, wherein the host unit is configured to send a signal to the first AAU indicating whether a wireless access point complying with an IEEE 802.11 standard or a second AAU is coupled downstream of the first AAU.

28. The host unit of claim 27, wherein if a second AAU is coupled downstream of the first AAU, the host unit is configured to send a greater amount of power in the first power signal than if the downstream device were a wireless access point.

29. The host unit of claim 20, wherein the first signals corresponding to the first cellular RF band communicated by the first RAN interface are RF signals in the first cellular RF band.

30. The host unit of claim 20, wherein the second signals corresponding to the second cellular RF band communicated by the second RAN interface are RF signals in the second cellular RF band.

31. The host unit of claim 20, wherein the first signals corresponding to the first cellular RF band communicated by the first RAN interface comply with the common public radio interface (CPRI) specification.

32. The host unit of claim 20, wherein the second signals corresponding to the second cellular RF band communicated by the second RAN interface comply with the common public radio interface (CPRI) specification.

33. The host unit of claim 20, wherein the RAN node is one of a base station, a base transceiver station, or an internet protocol (IP) gateway.

34. The host unit of claim 20, wherein the first transport signals are intermediate frequency (IF) signals.

35. The host unit of claim 20, wherein the second transport signals are intermediate frequency (IF) signals.

\* \* \* \* \*